United States Patent
Razzano et al.

(10) Patent No.: US 6,232,425 B1
(45) Date of Patent: May 15, 2001

(54) POLYMERIZATION PROCESS FOR FLUOROSILICONE POLYMERS

(75) Inventors: John S. Razzano, Cohoes; Nancy E. Gosh, East Greenbush, both of NY (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/224,670

(22) Filed: Dec. 31, 1998

(51) Int. Cl.$^7$ .................... C08G 77/08; C08G 77/06; C08G 77/24
(52) U.S. Cl. .................. 528/23; 528/21; 528/33; 528/34; 528/36; 528/42; 556/450; 556/451; 556/453; 556/460; 556/462; 556/467
(58) Field of Search ................. 528/21, 23, 33, 528/34, 36, 42; 556/450, 451, 453, 460, 467, 462

(56) References Cited

U.S. PATENT DOCUMENTS

| 3,607,899 | 9/1971 | Brown et al. |
| 4,267,298 | 5/1981 | Bluestein. |
| 4,888,405 * | 12/1989 | Gamon et al. .................... 528/23 |
| 5,514,828 | 5/1996 | Evans. |
| 6,037,434 * | 3/2000 | De Buyl et al. .................. 528/34 |
| 6,040,412 * | 3/2000 | Damme et al. ................... 528/34 |
| 6,043,388 * | 3/2000 | Perry ............................ 556/451 |
| 6,048,819 * | 12/1998 | Habimana ...................... 502/200 |
| 6,054,548 * | 4/2000 | Currie et al. .................... 528/23 |

FOREIGN PATENT DOCUMENTS

| 0311766 | 8/1988 | (EP). |
| 2299997 | 4/1996 | (GB). |

* cited by examiner

*Primary Examiner*—Robert Dawson
*Assistant Examiner*—Jeffrey B. Robertson

(57) ABSTRACT

A process for making organosilyl end-stopped diorganopolysiloxane fluid is provided comprising the steps of reacting an organic end-stopping compound with a fluorosilicone trimer in the presence of a catalytic amount of linear phosphonitrilic acid, and inactivating the linear phosphonitrilic acid, thereby forming organosilyl end-stopped diorganopolysiloxane fluid.

12 Claims, No Drawings

POLYMERIZATION PROCESS FOR FLUOROSILICONE POLYMERS

FIELD OF THE INVENTION

The invention relates to a process for producing fluorosilicone polymers.

BRIEF DESCRIPTION OF THE RELATED ART

Fluorosilicone polymers are used in a variety of applications such as for silicone greases, hydraulic fluids, anti-foam composition and paper-release compositions.

Previously, fluorosilicone oil was produced by a cumbersome and expensive process that resulted in low yield of product and significant waste. U.S. Pat. No. 4,267,298 to Blustein discloses a process for producing triorganosilyl end-stopped diorganopolysiloxane fluids by polymerizing fluoro-substituted cyclic trisiloxane with itself, or by reacting it with other cyclo-trisiloxanes in the presence of potassium hydroxide and water, or silanol end-stopped siloxane. The resulting disilanol stopped fluorosilicone oil is then treated with a large excess of trimethylchlorosilane to provide trimethylsiloxy termination. The excess chlorosilane and hydrochloric acid byproduct from chain stopping are removed by adding excess methanol to the reaction and then stripping the methanol, HCl and trimethoxysilane from the product.

The Bluestein process produces a significant amount of waste acidic methanol and only about 85% oil and 15% volatiles. The process is also inconsistent and it is difficult to achieve a product with a desired target viscosity. As a result, separate batches of fluorosilicone fluid are typically blended to achieve a final viscosity specification. U.S. Pat. No. 3,607,899 to Brown discloses a method for producing fluorosilicone oil in which fluorosilicone trimer is reacted with hexamethyldisiloxane in the presence of an acid-activated clay. This process is also cumbersome in that a first reaction occurs at a temperature of 75–90° C., followed by a subsequent reaction at 120–140° C. Then, the reaction is cooled and the acid-activated clay must be removed by filtration. For products exceeding about 1,000 cps, the removal of the acid-activated clay is difficult. Such products first must be dissolved in a solvent, the solution must then be filtered to remove the clay, and the solvent subsequently removed by stripping. The yield of product after a long strip of high temperature described as between 68–82%. The process also generates unusable fluorosilicone volatile waste, adding to the expense and difficulty of the process.

U.S. Pat. No. 5,514,828 to Evans discloses a method for making a polyfluoroalkylsiloxane fluid by polymerizing a fluorosilicone trimer in the presence of water in combination with a strong acid catalyst. The polymer is not subjected to a condensation reaction in which the water of condensation is removed to drive polymerization of the polymer, resulting in a polymer with a high silanol content.

There is a need in the art to produce fluorosilicone oil in high yield in an efficient manner, in which the process yields a large amount of product and limited waste.

SUMMARY OF THE INVENTION

The process of the invention comprises reacting a fluorosilicone trimer and organic end-stopping compound in the presence of a catalytic amount of linear phosphonitrilic chloride (LPNC) to form end-stopped diorganopolysiloxane fluid, and stopping the reaction by inactivating the LPNC. Optionally, the resulting end-stopped diorganopolysiloxane fluid may be stripped of volatiles.

DETAILED DESCRIPTION OF THE INVENTION

The method of the present invention comprises reacting a fluorosilicone trimer and organic end-stopping compound in the presence of a catalytic amount of linear phosphonitrilic chloride (LPNC) to form end-stopped diorganopolysiloxane fluid, and stopping the reaction by inactivating the LPNC. Optionally, the resulting end-stopped diorganopolysiloxane fluid may be stripped of volatiles by heating and removing the volatiles by a method such as applying a vacuum or by a nitrogen purge.

The fluorosilicone trimer used in the present invention has the general formula (I):

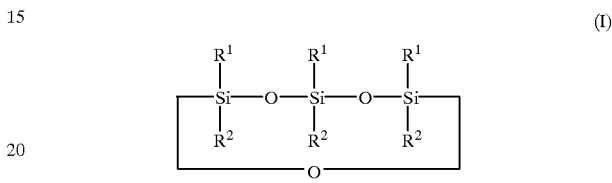

wherein $R^1$ is a monovalent hydrocarbon of 1–8 carbon atoms, and $R^2$ is a perfluoroalkylethylenyl radical of 3–8 carbon atoms. Of the trifluorosilicone trimers useful in the present invention, 1,3,5-tris(3,3,3-trifluoropropyl)-1,3,5-trimethylcyclotrisiloxane is preferred.

The organic end-stopping compounds that may be used with the present invention include, but are not limited to hexaorganodisiloxanes, organic anhydrides, halogenated silanes and mixtures thereof.

The hexaorganodisiloxanes suitable for use in the present invention are of the general formula (II):

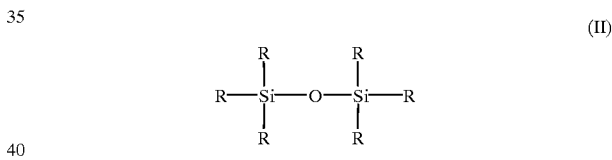

wherein the R groups are independently hydrogen, hydroxyl, alkyls of 1–8 carbon atoms, and vinyl groups of 2–8 carbon atoms. Examples of the hexaorganodisiloxanes, suitable for use in the present invention include, but are not limited to hexamethyldisiloxane, tetramethyldisiloxane, and divinyltetramethyidisiloxane.

The halogenated silanes suitable for use in the present invention have the general formula $R_3SiX$, wherein R is a monovalent alkyl radical of 1–8 carbon atoms, an alkenyl radical of 2–8 carbon atoms, a cycloalkyl radical of 4–8 carbon atoms, a mononuclear aryl radical of 6–8 carbon atoms, or a perfluoroalkylethylenyl radical of 3–8 carbon atoms; and X is a halogen, preferably, chlorine. Examples of the halogenated silanes that are suitable for use in the present invention include, but are not limited to trimethylchlorosilane, vinyidimethylchlorosilane, 3,3,3-trifluropropyldimethylchlorosilane, and phenyidimethylchlorosilane.

In one embodiment of the invention, fluorosilicone trimer is reacted with a hexaorganodisiloxane in the presence of a catalytic amount of linear phosphonitrilic chloride (LPNC). A catalytic amount of LNPC is generally about 50 ppm or more LPNC. The reaction can be performed at a temperature from about room temperature to about 130° C., more preferably from about 55–120° C., most preferably from about 70–100° C. At this temperature range, a smooth reaction occurs in which the viscosity of the product approaches the equilibrium viscosity over a period of about 2–4 hours.

LPNC is generally in the form of a solution in which LPNC is dissolved in methylene chloride. Typically a 2% solution of LPNC in methylene chloride is used as a stock solution. The concentration of LPNC in methylene chloride is such that the final concentration of LPNC when added to the reaction is at least 50 ppm.

The reaction is stopped by inactivation of LPNC. Volatiles content is influenced by the formation of cyclic hexamer, which has a high boiling point. It may or may not be necessary to remove the cyclic hexamer, based on whether pure polymer is desired. For low temperature applications, the hexamer will not evaporate and it may not be necessary to remove the cyclic hexamer. Of the cyclic molecules formed in the reaction, 1–2% of the cyclic molecules are tetramers & pentamers, which will come off in a stripping process. However, 5–6% are cyclic hexamers, which may not come off in the stripping process, or require much higher temperatures for stripping. Yield determinations are generally based on weight loss. This is performed by heating a sample to 135° C. at 15 mmHg for 45 minutes. The remaining weight is considered polymer. However, calculations of polymer yield based on weight loss are not accurate for polymer solutions containing cyclic hexamers. Although longer reaction times can lead to a volatiles content of up to about 8%, such long reaction times may be easily avoided.

LPNC may be inactivated by neutralizing the LPNC with the addition of a base. Any strong base is suitable for use in the present invention. Examples of based that are suitable for use include, but are not limited to sodium carbonate, sodium hydroxide, calcium carbonate, any amine, and the like. When inactivating the catalyst with a base, it is preferred not to use excess base as a strong base is a depolymerization catalyst. A preferred method of inactivation is hexamethyidisilizane in 2–5 fold excess. The silazane leads to the formation of insoluble ammonium chloride that makes the product hazy. Using a high temperature strip such as 250° C. at 20 mm Hg will strip out the ammonium chloride to give a clear product. Inactivation with $NaHCO_3$ or NaOH leads to the formation of insoluble salts that cannot be stripped out, but need to be filtered from the product, and therefore, are not preferred.

Alternatively, the LPNC catalyst may be inactivated by heat. Heat inactivation is preferable to base inactivation. Inactivation by heat is preferred because it prevents the accumulation of salt. Inactivation by heat may be accomplished by heating the reaction to a temperature of at least about 150° C. for about 1 hour.

Inactivation by heat will result in a concentration of volatiles of about 5–8% as heat inactivation requires a longer cycle time than the optimum cycle time for the highest yield of product. However, the amount of volatiles can be reduced by subjecting the reaction product to a high temperature strip to approach a yield of about 99% product. While a high temperature strip is required to achieve a reduction in volatiles to about 1%, the amount of expensive and unusable fluorosilicone waste streams is considerably reduced by this process. Moreover, viscosities of about 50–100,000 cps or more can be achieved.

Temperatures for the strip are generally from about 150–250° C. More preferably, the temperature range is from about 175–230° C. Most preferably, the temperature range is from about 190–220° C. The temperature selected is also in consideration of the pressure at which the strip is performed. Typically, the strip is conducted at a pressure of 3 mm Hg and a temperature of about 220° C.

In another embodiment of the invention, fluorosilicone trimer is reacted with an organic anhydride in the presence of a catalytic amount of LPNC to yield a diacetoxy-terminated fluorosilicone oil. In this embodiment, suitable organic anhydrides include acetic anhydride, maleic anhydride, itaconic anhydride, propionic anhydride, butyric anhydride, and the like.

In another embodiment, fluorosilicone trimer is reacted with acetoxysilane in the presence of a catalytic amount of LPNC. Suitable acetoxysilanes include methyltriacetoxysilane, dimethyldiacetoxysilane and their dimers.

EXAMPLES

Example 1

400 g of fluorosilicone cyclic trimer and 12 g of hexamethyldisiloxane were placed in a flask with an agitator. The batch was heated to 100° C. and 4 g of a 2% solution of linear phosphonitrillic chloride (LNPC) catalyst dissolved in methylene chloride was added. After 5 hours of polymerization, 5 drops of hexamethyidisilazane was added to deactivate the LPNC. The batch was heated to 220° C. at 3 mm Hg, and 60 g of volatiles were removed. Fluorosilicone oil in an amount of 335 g with a viscosity of 1060 cps and a 0.67% final weight loss was obtained.

Example 2

103 g of fluorotrimer and 3.6 g of trimethylchlorosilane were added to a flask equipped with a stirrer and a condenser and heated to 70° C. 0.4 g of a 2% solution of LPNC catalyst was added to the batch. Within 10 minutes the batch temperature rose to 75° C. from the exotherm resulting from the ring opening polymerization of the trimer. The batch temperature was raised to 80° C. and samples taken after 1, 2, and 3 hours. The weight loss of the samples at 135° C., 2 mm for 45 minutes were 36%, 12%, and 10% respectively. After 4 hours from time of catalyst addition, the batch was cooled to 25° C., and 5.3 g of hexamethyidisilazane was added to the reaction and the temperature rose to 29° C. The product was quite hazy from the formation of ammonium chloride. The reaction contents were agitated at high rpm and a vacuum of 4 mm was applied. The batch temperature was raised to 260° C. for 20 minutes to remove volatile components. A clear product oil (87.5 g) was isolated with a viscosity of 1220 cps, and a weight loss of 0.25% (135° C., 2 mm, 45 minutes).

Those of ordinary skill in the art appreciate that many variations and substitutions may be made without departing from the spirit of the invention. It should be understood that the foregoing examples are intended as illustrations of the invention and are not to be interpreted as limitations or restrictions on the scope of the invention, which is defined in the appended claims.

What is claimed is:

1. A process for making an organosilyl end-stopped diorganopolysiloxane fluid comprising the steps of:

reacting an organic end-stopping compound with a fluorosilicone trimer in the presence of a catalytic amount of a linear phosphonitrilic chloride, thereby forming a reaction; inactivating said linear phosphonitrilic chloride, by heating the reaction to at least about 150° C. thereby forming organosilyl end-stopped diorganopolysiloxane fluid containing volatiles.

2. The process according to claim 1, wherein said linear phosphonitrilic chloride is inactivated by adding a sufficient amount of base to neutralize said linear phosphonitrilic chloride.

3. The process according to claim 2, wherein said base is selected from the group consisting of sodium hydroxide, potassium hydroxide, lithium hydroxide, calcium carbonate, sodium carbonate, silazane, ammonia, cyclohexylamine, and butylamine.

4. The process according to claim 1 further comprising the step of stripping said volatiles from said organosilyl end-stopped diorganopolysiloxane by heating said organosilyl end-stopped diorganopolysiloxane to temperature of at least about 150° C. and removing volatiles.

5. The process according to claim 4 wherein said volatiles are removed by applying a vacuum.

6. The process of claim 4 wherein said volatiles are removed by a nitrogen purge.

7. The process according to claim 1 wherein the organic end-stopping compound is selected from the group consisting of hexaorganodisiloxanes, organic anhydrides, halosilanes, acetoxysilanes, and their mixtures.

8. The process according to claim 7, wherein said hexaorganodisiloxanes are selected from the group consisting of hexamethyldisiloxane, tetramethyidisiloxane, divinyltetramethyldisiloxane and their mixtures.

9. The process according to claim 7, wherein said halosilanes are of the formula $R_3SiX$ wherein R is independently a monovalent alkyl radical of 1–8 carbon atoms, an alkenyl radical of 2–8 carbon atoms, a cycloalkyl radical of 4–8 carbon atoms, a mononuclear aryl radical of 6–8 carbon atoms, or a perfluoroalkylethylenyl radical of 3–8 carbon atoms; and X is a halogen.

10. The process of claim 7, wherein said organic anhydrides are selected from the group consisting of acetic anhydride, maleic anhydride, itaconic anhydride, propionic anhydride, butyric anhydride, and their mixtures.

11. The process according to claim 7, wherein said halosilanes are selected from the group consisting of trimethylchlorosilane, vinyldimethylchlorosilane, 3,3,3-trifluoropropyldimethylchlorosilane, and phenyldimethylchlorosilane, and their mixtures.

12. The process according to claim 11, wherein said acetoxysilane is selected from the group consisting of methyltriacetoxysilane, dimethyidiacetoxysilane, their mixtures, and their dimers.

* * * * *